United States Patent
Kuo (10) Patent No.: US 9,579,849 B2
(45) Date of Patent: Feb. 28, 2017

(54) HOLE EXPANDING DEVICE FOR LENS HOLDER

(71) Applicant: HON HAI PRECISION INDUSTRY CO., LTD., New Taipei (TW)

(72) Inventor: Chang-Wei Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 665 days.

(21) Appl. No.: 13/968,369

(22) Filed: Aug. 15, 2013

(65) Prior Publication Data

US 2014/0231392 A1  Aug. 21, 2014

(30) Foreign Application Priority Data

Feb. 20, 2013  (TW) .............................. 102105791 A (51) Int. Cl.
*B23H 1/00* (2006.01)
*B29C 67/00* (2006.01)
*G02B 7/02* (2006.01)

(52) U.S. Cl.
CPC ...... *B29C 67/00* (2013.01); *B29C 2793/0045* (2013.01); *G02B 7/02* (2013.01)

(58) Field of Classification Search
CPC .... B29C 67/00; B29C 2793/0045; G02B 7/02
USPC .................................................. 49/67, 194, 195
See application file for complete search history.

(56) References Cited

U.S. PATENT DOCUMENTS

| 2,272,894 | A | * | 2/1942 | Hulslander | ........... B26F 1/0015 156/352 |
| 3,355,338 | A | * | 11/1967 | Heeley | .................... B29C 65/56 156/160 |
| 4,318,874 | A | * | 3/1982 | Lemelson | ........... B29C 37/0003 264/255 |
| 7,168,935 | B1 | * | 1/2007 | Taminger | ........... B23K 15/0073 219/121.12 |

* cited by examiner

*Primary Examiner* — David Angwin
*Assistant Examiner* — Amit K Singh
(74) *Attorney, Agent, or Firm* — Zhigang Ma (57) ABSTRACT

A hole expanding device includes an electric heating device, a moving device, an rotating device, and a carrying device. The electric heating device includes a transition portion and a hole expanding rod fixed onto the transition portion. The electric heating device heats the hole expanding rod to a predetermined temperature. The rotating device is fixed onto the moving device. The moving device drives the rotating device to move along a direction parallel to the hole expanding rod. The carrying device is fixed onto the rotating device and includes a receiving groove for receiving and fixing a workpiece. The rotating device rotates the carrying device to make two opposite surfaces of the workpiece face the hole expanding rod.

7 Claims, 7 Drawing Sheets

HOLE EXPANDING DEVICE FOR LENS HOLDER

BACKGROUND

1. Technical Field

The present disclosure relates to lens holders, and particularly to a hole expanding device for a lens holder.

2. Description of Related Art

Many lens modules with a focusing function include at least one guide rod and a lens holder, where the lens holder defines at least one guide hole. The guide rod is held steady by the guide holes. However, if a gap between the guide rod and the guide holes is too large, the guide rod will not be held securely. If the gap is too small, the guide rod will be too difficult to move. Methods for making the guide holes involve a hole expanding rod expanding the holes by heating. However, as the hole expanding rod enters through the guide holes, different contact times between the guide holes and the hole expanding rod result in uneven diameters of the guide holes.

Therefore, it is desirable to provide a hole expanding device that can overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments will now be described in detail below with reference to the drawings.

Figure 1:
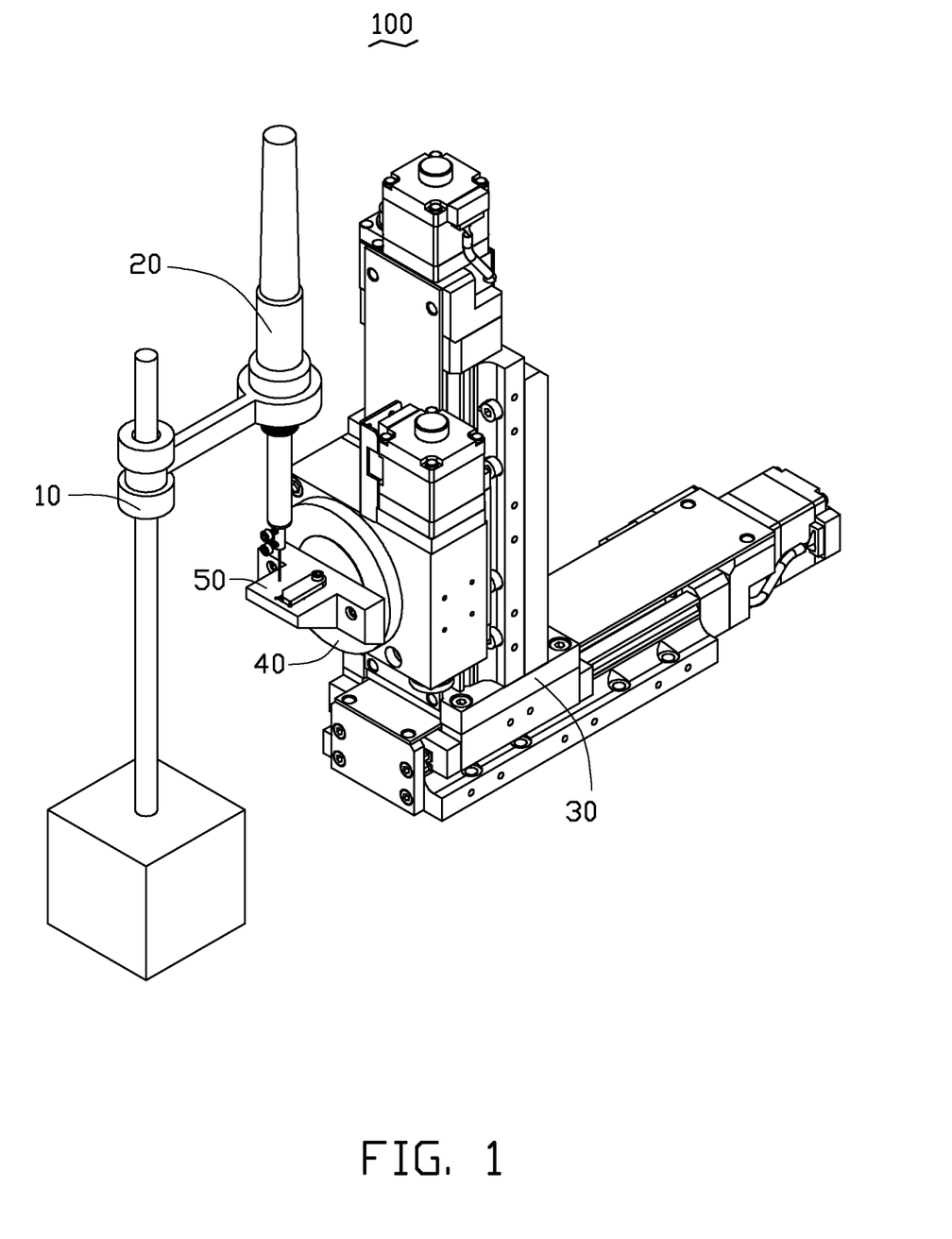
FIG. 1 is a perspective view of a hole expanding device, according to an embodiment.
Figure 2:
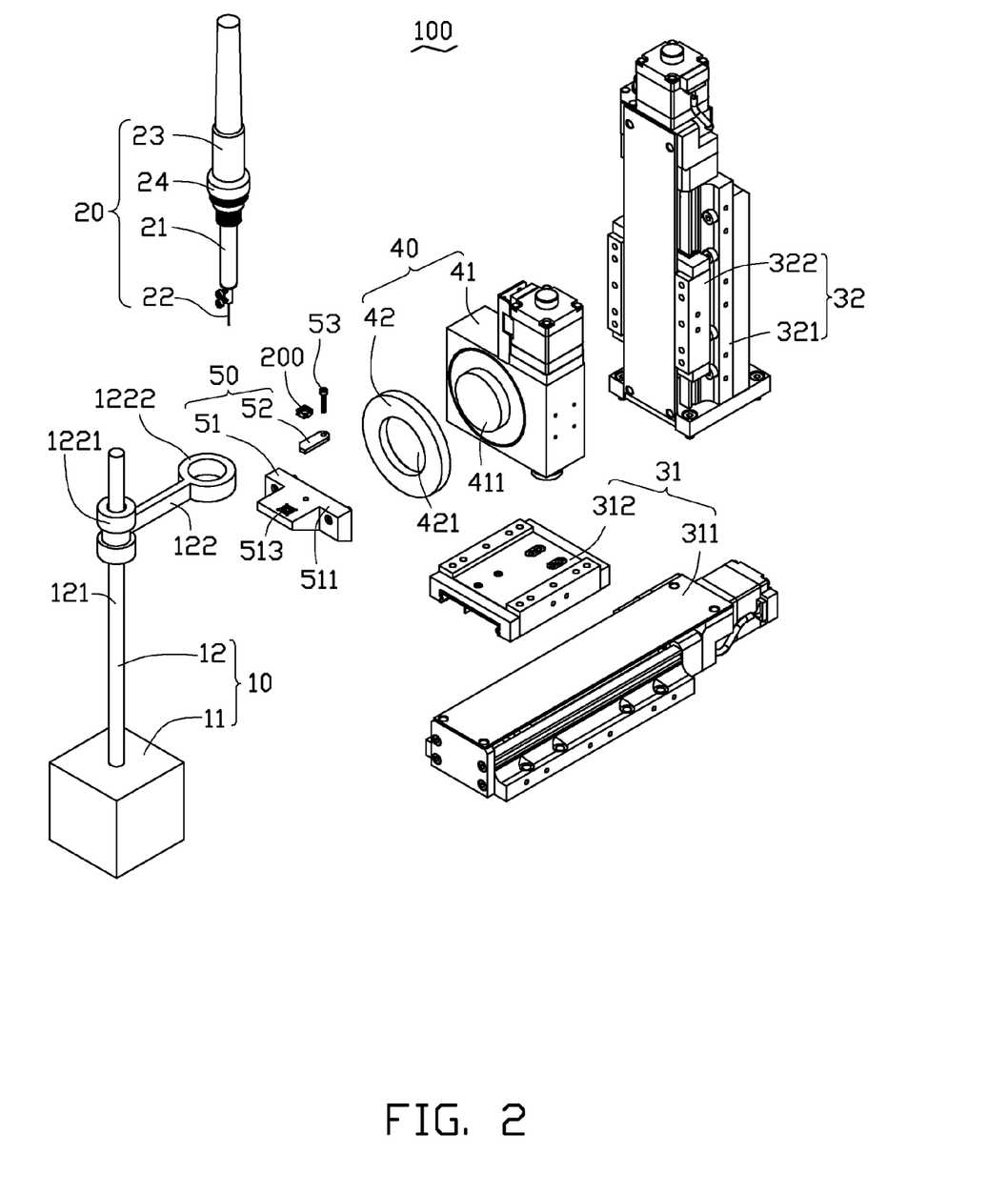
FIG. 2 is an exploded schematic view of the hole expanding device of FIG. 1.
Figure 3:
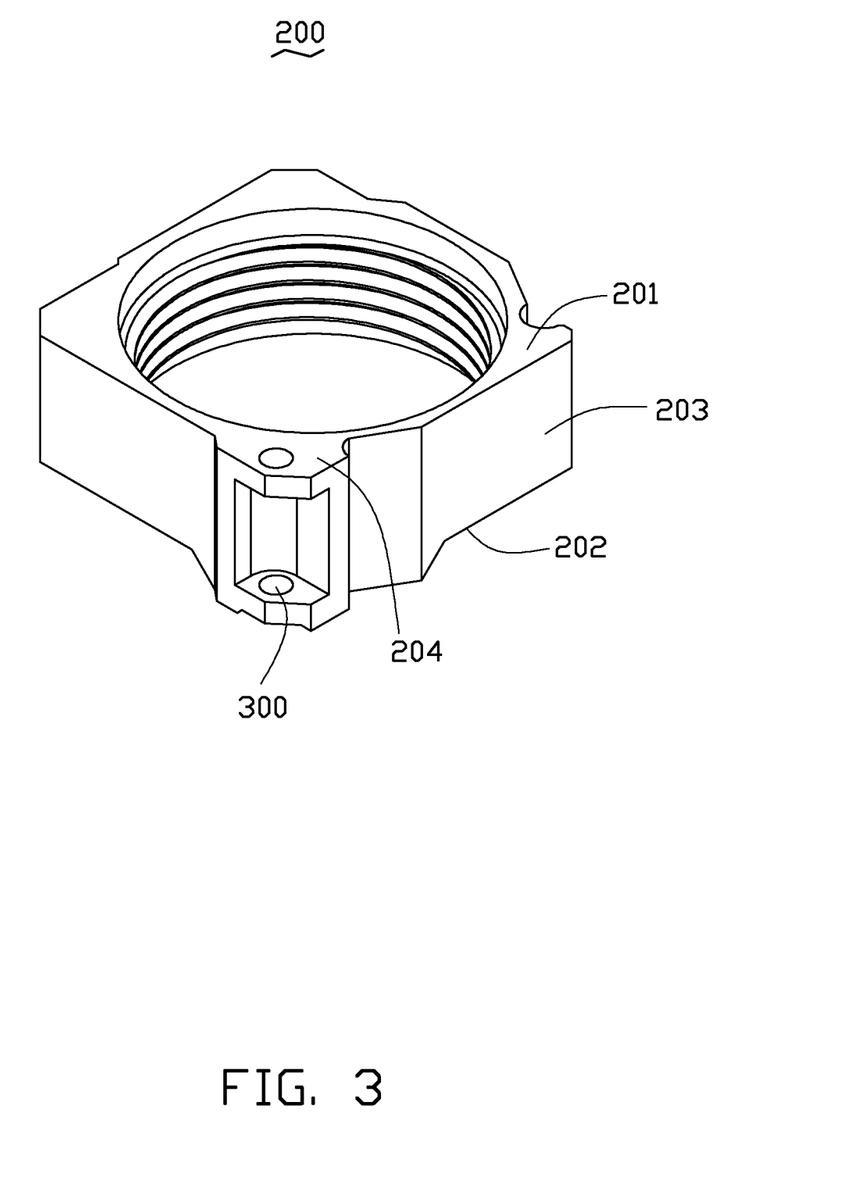
FIG. 3 is a perspective view of a lens holder.

FIGS. 1 to 3 show a hole expanding device 100 according to an exemplary embodiment. The hole expanding device 100 is used to expand a pair of reference holes 300. The hole expanding device 100 includes a fixing device 10, an electric heating device 20, a moving device 30, an rotating device 40, and a carrying device 50.

In this embodiment, a workpiece 200 is a lens holder, which includes a top surface 201, a bottom surface 202 opposite to the top surface 201, and a side surface 203 connected between the top surface 201 and the bottom surface 202. Two guide portions 204 extend substantially perpendicularly from the side surface 203. One of the guide portions 204 is coplanar with the top surface 201, and the other guide portion 204 is coplanar with the bottom surface 202. Each guide portion defines a reference hole 300. Axes of the reference holes 300 are colinear with each other and are parallel to an optical axis of the workpiece 200.

The fixing device 10 includes a holder 11 and a supporting bracket 12. The supporting bracket 12 includes a supporting rod 121 and a connecting portion 122. The supporting rod 121 is substantially cylindrical with one end substantially vertically fixed to the holder 11. The connecting portion 122 includes a first collar 1221 and a second collar 1222. The first and the second collars 1221 and 1222 are located at opposite ends of the connecting portion 122. The connecting portion 122 is placed around the supporting rod 121 via the first collar 1221. A fastener (not shown) can be set between the first collar 1221 and the supporting rod 121, such that a position of the connecting portion 122 can be adjusted on the supporting rod 121.

The electric heating device 20 is placed in the second collar 1222 of the fixing device 10 and includes a transition portion 21, a hole expanding rod 22, a heating portion 23, and an adjusting portion 24. The hole expanding rod 22 is substantially cylindrical and having different diameters. The hole expanding rod 22 is fixed to the transition portion 21 by at least one screw (not numbered). Therefore, the hole expanding rod 22 is detachably fixed to the transition portion 21. The heating portion 23 is fixed on the other end of the hole expanding rod 22 and is electrically connected to an external power source (not shown). The hole expanding rod 22 passes through the transition portion 21 and is electrically connected to the heating portion 23. The adjusting portion 24 is a circular ring and is rotary coiled around the heating portion 23. Temperature of the hole expanding rod 22 is adjusted by rotating the adjusting portion 24.

The moving device 30 includes an X-axis driving device 31 and a Z-axis driving device 32. A driving direction of the X-axis driving device 31 is substantially perpendicular to a driving direction of the Z-axis driving device 32. The X-axis driving device 31 includes an X-axis driving motor 311 and an X-axis driving seat 312 fixed on the X-axis driving motor 311. The X-axis driving seat 312 is driven by the X-axis driving motor 311 along an X-axis direction. The Z-axis driving device 32 includes a Z-axis driving motor 321 and a Z-axis driving seat 322 fixed on the Z-axis driving motor 321. The Z-axis driving seat 322 is driven by the Z-axis driving motor 321 along a Z-axis direction. The Z-axis driving motor 321 is fixed onto the X-axis driving seat 312.

The rotating device 40 includes a rotating motor 41 and a rotating plate 42. The rotating motor 41 is fixed onto the Z-axis driving seat 322 and includes a rotating axle 411. An extending direction of the rotating axle 411 is substantially parallel to the driving direction of the X-axis driving device 31, and the rotating axle 411 is rotated by the rotating motor 41. A center of the rotating plate 42 defines a mating hole 421, which is placed around the rotating axle 411.

The carrying device 50 is fixed onto the rotating plate 42 and includes a carrying platform 51 and a holding piece 52. The carrying platform 51 includes an upper surface 511 and an opposite lower surface 512. One side of the carrying platform 51 is connected to and fixed with the rotating plate 42. The upper surface 511 defines a receiving groove 513 for receiving and locating the workpiece 200, and the lower surface 512 defines a through hole 514 that extends through a bottom of the receiving groove 513. The holding piece 52 is rotatably fixed to the upper surface 511 by a screw 53.

Figure 4:
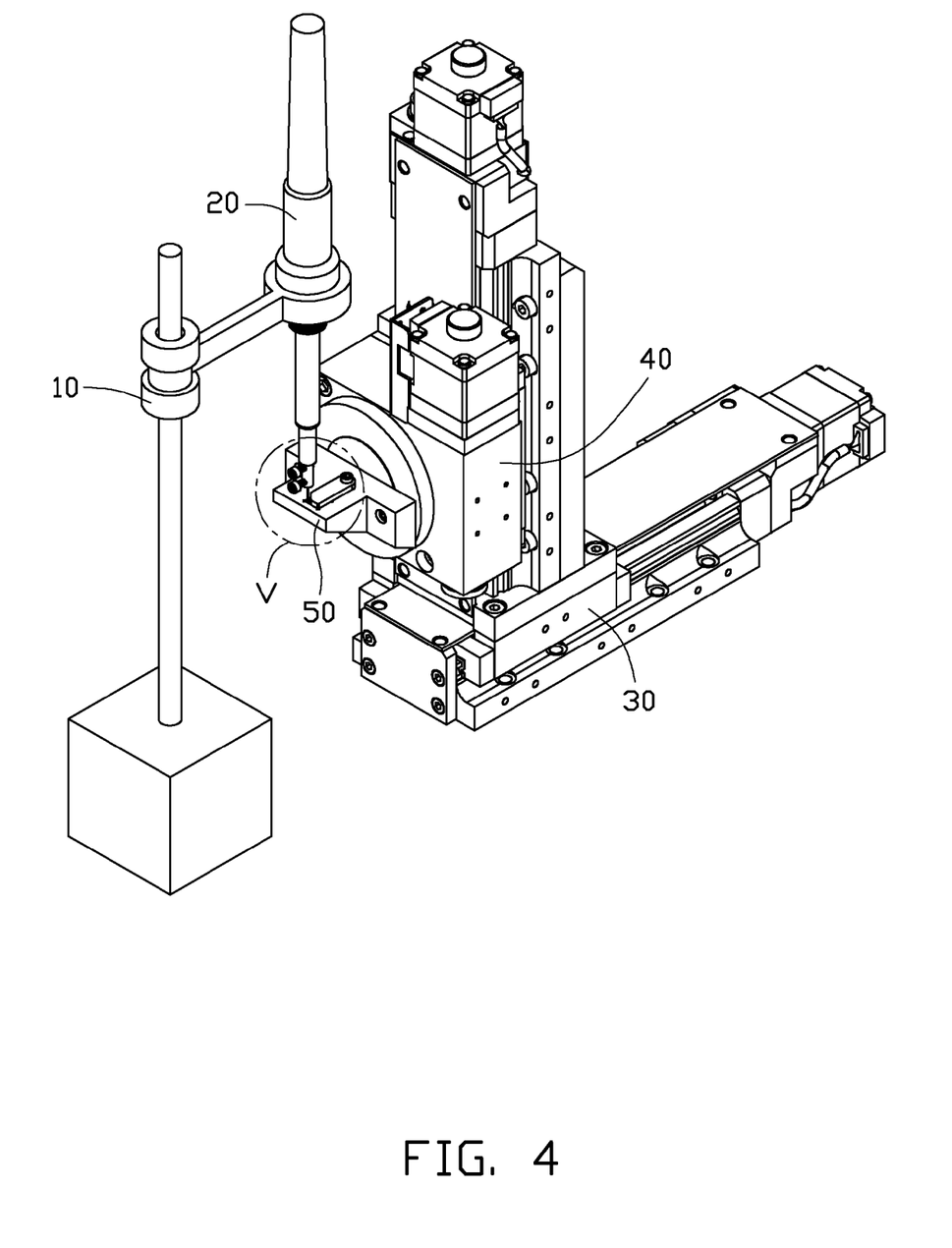
FIG. 4 is a diagram of the hole expanding device of FIG. 1 in a state of use.
Figure 5:
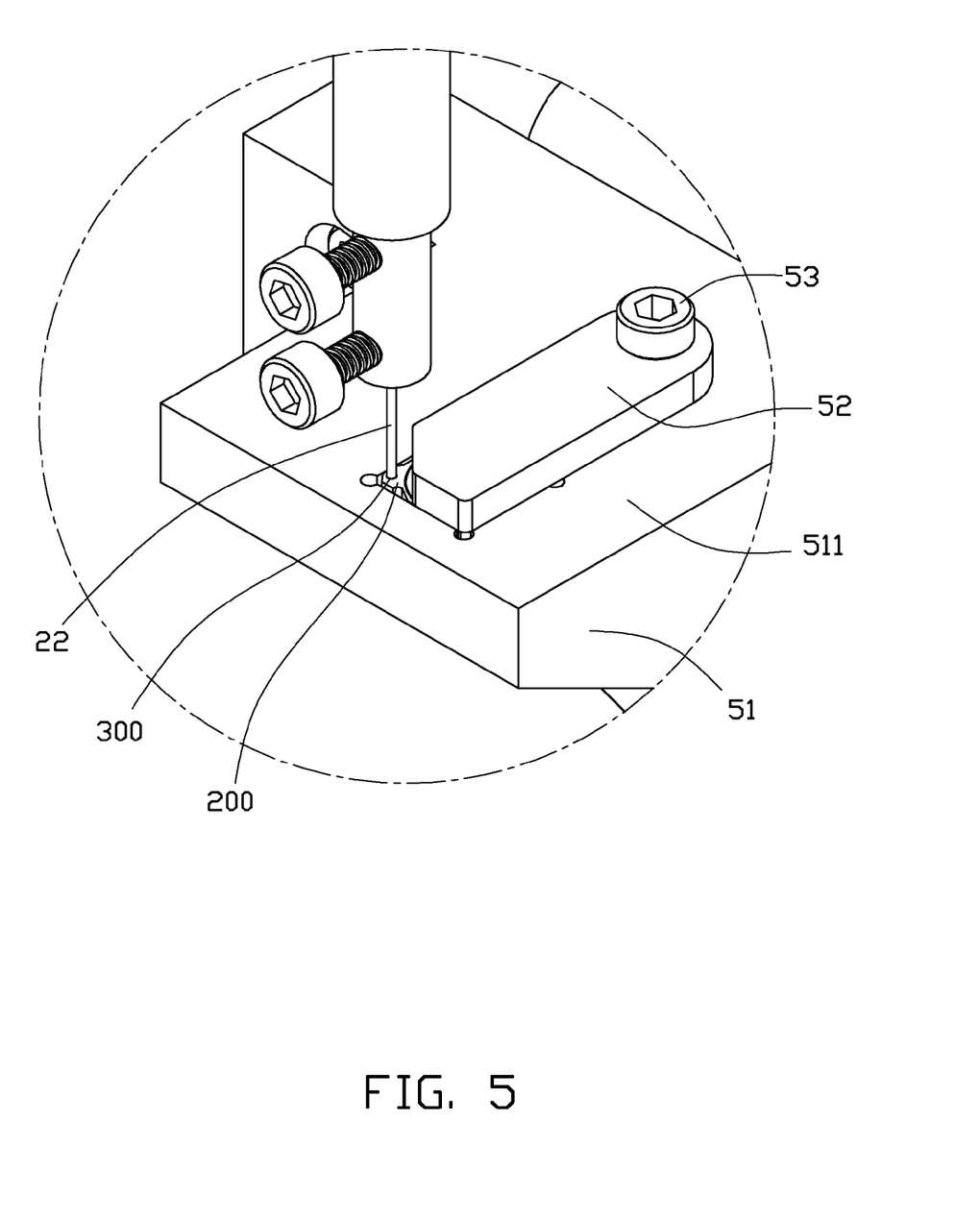
FIG. 5 is a partially enlarged view of portion V of FIG. 4.

Referring to FIGS. 4 and 5, when enlarging the reference hole 300 in the workpiece 200, the workpiece 200 is placed in the receiving groove 513 of the carrying platform 51, such that the reference hole 300 is aligned with the through hole 514, and the top surface 201 of the workpiece 200 is coplanar with the upper surface 511 of the carrying platform 51. The holding piece 52 is rotated to cover a top of the receiving groove 513, such that the workpiece 200 is restricted in the receiving groove 513 by the holding piece 52. The carrying platform 51 is rotated by the rotating motor 41 until the top surface 201 of the workpiece 200 faces upward. The carrying platform 51 is driven toward the fixing device 10 by the X-axis driving device 31, and the position of the fixing device 10 is adjusted, such that the workpiece 200 is located beneath the hole expanding rod 22 and the hole expanding rod 22 is aligned with the reference hole 300. Finally, the carrying platform 51 is driven toward the hole expanding rod 22 by the Z-axis driving device 32 until the hole expanding rod 22 passes through the reference hole 300 in order to expand the reference hole 300. The hole expanding rod 22 is heated, causing the hole expanding rod 22 to expand, which expands the reference hole 300.

Figure 6:
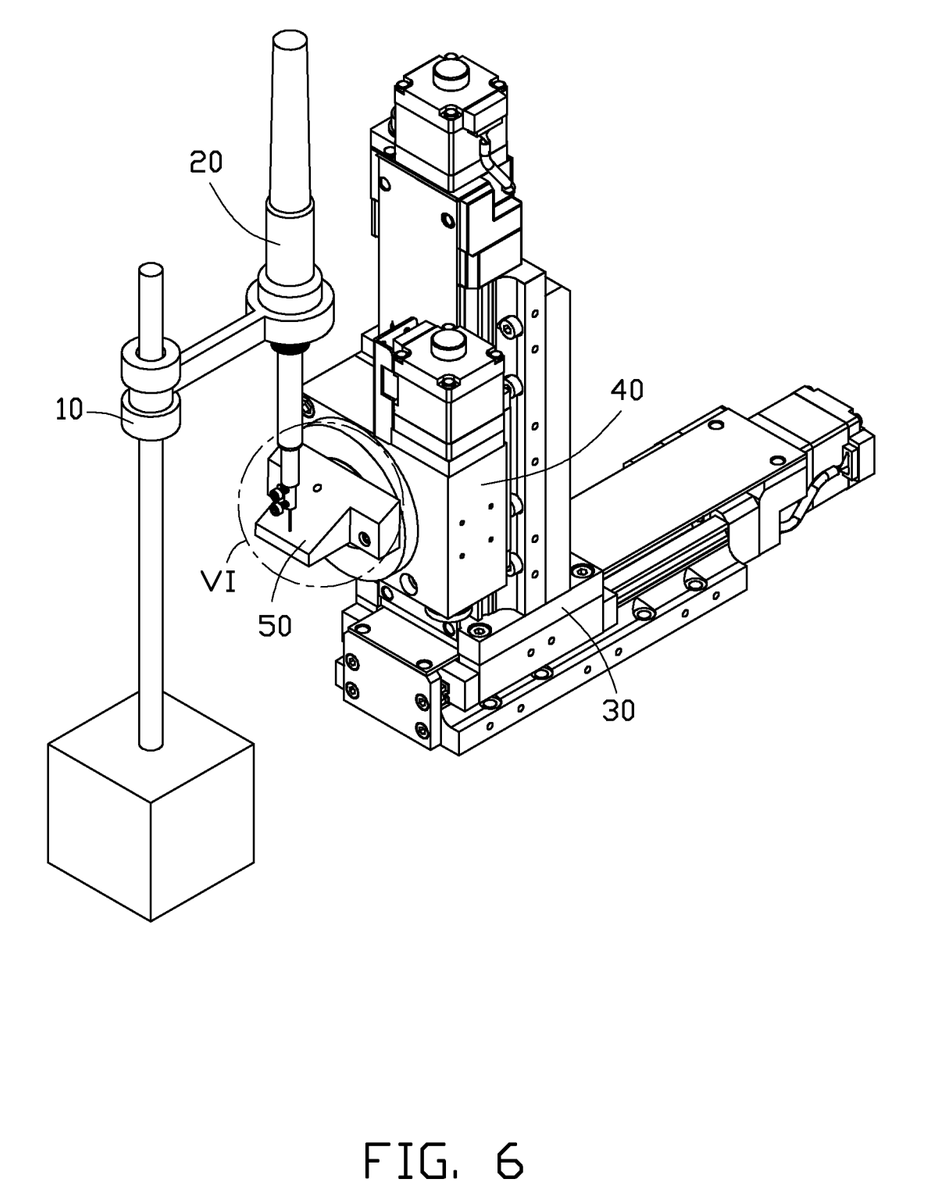
FIG. 6 is a diagram of the hole expanding device of FIG. 1 in another state of use.
Figure 7:
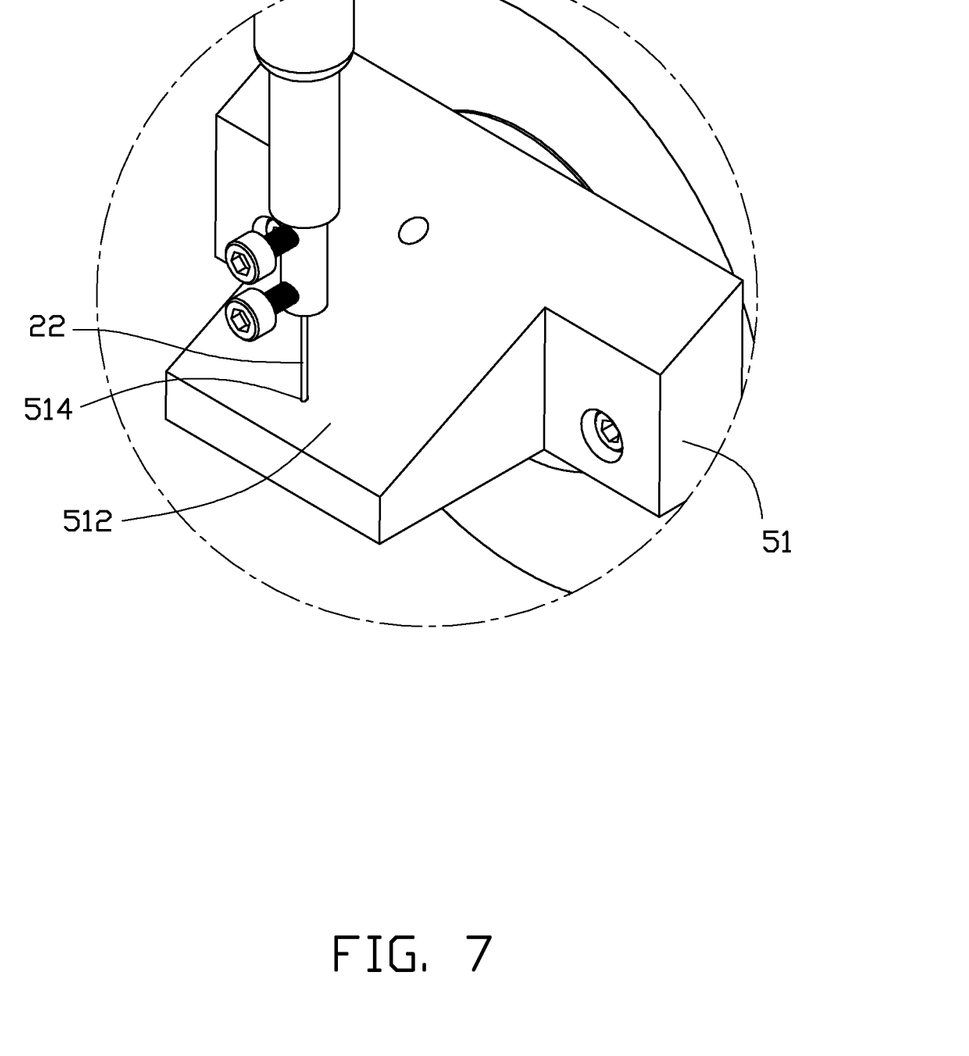
FIG. 7 is a partially enlarged view of portion VI of FIG. 6.

Referring to FIGS. 6 and 7, after the hole expansion of the reference hole 300 is complete. The carrying platform 51 is driven by the Z-axis driving device 32 along a direction away from the hole expanding rod 22 until the hole expanding rod 22 withdraws from the reference hole 300. The rotating motor 41 drives the carrying platform 51 to rotate 180 degrees until the bottom surface 512 of the carrying platform 51 faces upward. The carrying platform 51 is driven toward the hole expanding rod 22 by the Z-axis driving device 32 until the hole expanding rod 22 enters the through hole 514 and passes through the reference hole 300 close to the bottom surface 202 of the workpiece 200, in order to expand the other reference hole 300.

In this embodiment, the carrying device 50 is fixed onto the rotating device 40 of the hole expanding device 100. When the hole expanding rod 22 completes the hole expansion of one side reference hole 300 of the workpiece 200, the workpiece 200 is rotated by the rotating device 40 to allow the other side reference hole 300 to be expanded by the hole expanding rod 22, thereby preventing uneven contact time between the two side reference holes 300 and the hole expanding rod 22. This way, the diameters of the reference holes 300 are ensured to be the same.

Although the present disclosure has been specifically described on the basis of these exemplary embodiments, the disclosure is not to be construed as being limited thereto. Various changes or modifications may be made to the embodiments without departing from the scope and spirit of the disclosure.

What is claimed is:

1. A hole expanding device, comprising:
an electric heating device comprising a hole expanding rod;
a moving device;
a rotating device fixed onto the moving device; and
a carrying device fixed onto the rotating device, and comprising a receiving groove configured to fix and receive a workpiece;
wherein the electric heating device is configured to heat the hole expanding rod to a predetermined temperature; the moving device drives the rotating device toward the hole expanding rod; the rotating device rotates the carrying device, and makes two opposite surfaces of the workpiece respectively move toward the hole expanding rod;
wherein the carrying device comprises a carrying platform; the carrying platform includes an upper surface and an opposite lower surface; one side of the carrying platform is connected to and fixed with the rotating plate; the upper surface defines a receiving groove, and the lower surface defines a through hole that extends through a bottom of the receiving groove; and wherein the carrying device comprises a holding piece is rotatably fixed on the upper surface by a screw, the holding piece is rotated to cover a top of the receiving groove so as to restrict the workpiece in the receiving groove.

2. A hole expanding device, comprising:
an electric heating device comprising a hole expanding rod;
a moving device;
a rotating device fixed onto the moving device; and
a carrying device fixed onto the rotating device, and comprising a receiving groove configured to fix and receive a workpiece;
wherein the electric heating device is configured to heat the hole expanding rod to a predetermined temperature; the moving device drives the rotating device toward the hole expanding rod; the rotating device rotates the carrying device, and makes two opposite surfaces of the workpiece respectively move toward the hole expanding rod;
wherein the moving device comprises an X-axis driving device and a Z-axis driving device; a driving direction of the X-axis driving device is substantially perpendicular to a driving direction of the Z-axis driving device; the rotating device is fixed onto the Z-axis driving device;
wherein the X-axis driving device comprises an X-axis driving motor and an X-axis driving seat fixed on the X-axis driving motor; the Z-axis driving device comprises a Z-axis driving motor and a Z-axis driving seat fixed on the Z-axis driving motor;
wherein the rotating device comprises a rotating motor and a rotating plate; the rotating motor is fixed onto the Z-axis driving seat and comprises a rotating axle; an extending direction of the rotating axle is substantially parallel to the driving direction of the X-axis driving device, and the rotating axle is rotated by the rotating motor; a center of the rotating plate defines a mating hole, which is placed around the rotating axle; and
wherein the carrying device comprises a carrying platform; the carrying platform includes an upper surface and an opposite lower surface; one side of the carrying platform is connected to and fixed with the rotating plate; the upper surface defines a receiving groove, and the lower surface defines a through hole that extends through a bottom of the receiving groove.

3. The hole expanding device as claimed in claim 2 wherein the carrying device comprises a holding piece is rotatably fixed on the upper surface by a screw.

4. The hole expanding device as claimed in claim 1, wherein the hole expanding device comprises a fixing device, the electric heating device is fixed on the fixing device.

5. The hole expanding device as claimed in claim 1, wherein the moving device comprises an X-axis driving device and a Z-axis driving device; a driving direction of the X-axis driving device is substantially perpendicular to a driving direction of the Z-axis driving device; the rotating device is fixed onto the Z-axis driving device.

6. The hole expanding device as claimed in claim 5, wherein the X-axis driving device comprises an X-axis driving motor and an X-axis driving seat fixed on the X-axis driving motor; the Z-axis driving device comprises a Z-axis driving motor and a Z-axis driving seat fixed on the Z-axis driving motor.

7. The hole expanding device as claimed in claim 6, wherein the rotating device comprises a rotating motor and a rotating plate; the rotating motor is fixed onto the Z-axis driving seat and comprises a rotating axle; an extending direction of the rotating axle is substantially parallel to the driving direction of the X-axis driving device, and the rotating axle is rotated by the rotating motor; a center of the rotating plate defines a mating hole, which is placed around the rotating axle.

\* \* \* \* \*